FIG. 1

INVENTOR.
FRANK E. OILER

Nov. 6, 1956  R. E. OILER  2,769,369
MICROFILM PRINTER
Filed Nov. 16, 1953  14 Sheets-Sheet 2

FIG. 2

INVENTOR.
FRANK E. OILER
BY
Frank H. Harmon
ATTORNEY

Nov. 6, 1956

R. E. OILER 2,769,369

MICROFILM PRINTER

Filed Nov. 16, 1953

*INVENTOR.*
FRANK E. OILER

BY

*AT TORNEY*

Nov. 6, 1956  R. E. OILER  2,769,369
MICROFILM PRINTER
Filed Nov. 16, 1953  14 Sheets-Sheet 5

INVENTOR.
FRANK E. OILER
BY
Frank H. Harmon
ATTORNEY

Nov. 6, 1956  R. E. OILER  2,769,369
MICROFILM PRINTER
Filed Nov. 16, 1953  14 Sheets-Sheet 7

FIG. 10

INVENTOR.
FRANK E. OILER
BY
*Frank H. Harmon*
ATTORNEY

Nov. 6, 1956  R. E. OILER  2,769,369
MICROFILM PRINTER
Filed Nov. 16, 1953  14 Sheets-Sheet 8

FIG. 11

INVENTOR.
FRANK E. OILER
BY
*Frank K. Harmon*
ATTORNEY

Nov. 6, 1956

R. E. OILER 2,769,369

MICROFILM PRINTER

Filed Nov. 16, 1953

INVENTOR.
FRANK E. OILER
BY
AT TORNEY

Nov. 6, 1956 R. E. OILER 2,769,369
MICROFILM PRINTER
Filed Nov. 16, 1953 14 Sheets-Sheet 12

INVENTOR.
FRANK E. OILER
BY

ATTORNEY

FIG. 18

*INVENTOR.*
FRANK E. OILER
BY
*ATTORNEY*

Nov. 6, 1956

R. E. OILER

2,769,369

MICROFILM PRINTER

Filed Nov. 16, 1953

INVENTOR.
FRANK E. OILER
BY
*Frank N Harmon*
ATTORNEY

United States Patent Office 2,769,369
Patented Nov. 6, 1956

2,769,369

MICROFILM PRINTER

Frank E. Oiler, Cleveland, Ohio, assignor to Oscar Smith, Cleveland, Ohio

Application November 16, 1953, Serial No. 392,147

5 Claims. (Cl. 88—24)

This invention relates in general to a combined viewer and printer for use in connection with photography, and more particularly with micro photographic records, and is a continuation in part of my application, Serial No. 294,600, for Microfilm Printer, filed June 20, 1952, now abandoned.

One of the primary objects of my invention is to provide a self-contained device in which micro photographic records recorded on strip film may be conveniently and rapidly examined in enlarged image and by which positive enlarged prints may be readily and rapidly made of the micro photographs located by the viewer.

Another object is to provide such a self-contained device wherein correlated automatically operated means are provided to operate in sequence throughout a cycle, or any desired number of cycles, of operation, whereby sensitized paper is automatically fed from a roll onto the exposure table prior to exposure, automatically exposed, and the exposed portion of the roll of sensitized paper automatically severed from the remainder of the roll and drawn from the exposure table and conveyed through a developing, fixing and washing bath and delivered to the exterior through a convenient chute as a finished article.

Another object of the invention is to provide in such a self-contained device means whereby there is precluded any possibility of any inadvertent operation of the sensitized paper feeding means while the optical system is so adjusted as to provide for viewing the image of the film and whereby such sensitized paper feeding mechanism is only capable of operation when the optical system is adjusted to the proper position for projecting the image of the film onto the sensitized paper.

A further object of the invention is to so correlate the feeding mechanism for the sensitized paper, with respect to the operation of the cutting blade, that each exposure and cutting operation constitutes a single cycle and that for every given pre-determined length of sensitized paper, it is automatically and necessarily cut to the rear, or trailing, edge thereof, and positively removed from the table and delivered to the developer assembly, so as to leave no sensitized paper on the exposure table at any time, except when the feeding and cutting mechanisms are set into a correlated cycle of operation, whether as a setting for a single or multiple operation, so as to insure against inadvertent exposure of any of the sensitized paper to light from the outside, should the operator inadvertently or purposely open the cabinet for internal inspection.

With the foregoing and other objects in view, the invention resides in the combination of parts and in the details of construction hereinafter set forth in the following specification and appended claims, certain embodiments thereof being illustrated in the accompanying drawings, in which:

In the form shown in the drawings, the projector printer is a self-contained unit that provides for selective feeding of a microfilm across a path of light to form an image, the magnification of the image, and the projection of the enlarged image onto a screen to be viewed by the operator.

The film feeding mechanism is carried by a carriage that permits adjustment in three planes for reading and proper centering for subsequent projection onto the sensitized paper. Simple means are provided for adjusting mirrors from the reading position to a position for exposure of the paper. The sensitized paper feeding means is under manual switch control and automatically motored operated for single, or selective multiple, exposure of consecutive lengths of sensitized paper drawn from an unexposed roll. The sensitized paper feeding mechanism is correlated with the cutting knife so as to cut uniform lengths of sensitized paper. An important feature of the machine is the cutting of the prescribed length of sensitized paper at the completion of its exposure and behind, or at the trailing edge of the strip, and the exposed sheet positively removed from the table and delivered to the developer assembly, so that when the exposure apparatus is not in operation there is no sensitized paper left on the exposure table to be ruined by exposure to light upon opening the exposure cabinet for inspection. The exposed film developing unit is designed for positive feed and timed for progressive predetermined intervals of immersion of the exposed paper in consecutive liquid containing receptacles and for ultimate delivery through a discharge chute as a finished article.

Referring more particularly to the drawings, there is provided a projector printer wherein the housing is divided into a compartment 1 for the adjustable mirror system for viewing the enlarged image of the film, a compartment 2 for the exposure and cutting of the sensitized paper, a compartment 3 for developing the exposed sensitized paper and a compartment 4 for feeding and enlarging an image of the film. A translucent film viewing screen 5 is mounted in the front face compartment 1.

Compartment 4 houses a lamp 6 that is arranged to project a beam of light to an angularly disposed mirror 7 and through lenses 8 through the microfilm 9 advanced by feed rollers 10 in the film holder 11, so as to be viewed through a glass 12. Above the film holder suitable lenses are mounted in a lens tube 13. Directly above the tube 13 is a stationary mirror 14 that reflects the image formed by the lenses through an opening in compartment 2 into the upper compartment 1. Toward the rear of compartment 1 is a second stationary mirror 15 mounted so as to intersect the image reflected from the first stationary mirror 14 and project the image onto the translucent viewing screen 5 mounted in the front face of the upper compartment. The lenses and the film holder are arranged so that the image is focused and projected onto the viewing screen 5. A movable mirror 16 is pivoted at 16′ and is arranged to move from the viewing position shown in phantom lines in Figure 2 to the printing position shown in solid in Figure 2 by a hand crank 17. A counterweight 18 and cable 18′ are used to stabilize the mirror in either adjusted position. When the movable mirror 16 is in the printing position, it intersects the image reflected from the second stationary reflecting mirror 15 and is arranged to reflect the image onto the sensitized paper on the exposure table, the details of which will be further described hereinafter. The movable mirror 16 is so arranged so that the focal length of the optical system when the mirror is arranged to reflect the image onto the exposure table is identical with the focal length of the system when viewing the image on the viewing screen 5. The lenses are, of course, provided with focusing adjustment to insure a sharp image. The crank handle 17 and the conventional means of attachment to the movable mirror 16 provides a convenient means for moving of the movable mirror from the exposure position to the viewing position. Suitable stops may be provided within the upper compartment 1 for the dual purpose of limiting the motion of the movable mirror, as well as isolating the portion of the upper compartment containing the exposing table so as to prevent any light which might come through the viewing screen 5 from striking the sensitized paper.

The film feeding mechanism is provided with two reels 10 adapted to feed the film 9 across the film holder 11. A crank 10′ is arranged to turn the reels, thereby moving the film through the film holder to permit the operator to select the particular portion of the microfilm desired and position it in the film holder for viewing or printing. The film feeding mechanism is also mounted to be rotated about a vertical axis to permit rotation of the image to any desired axis.

Figure 3:
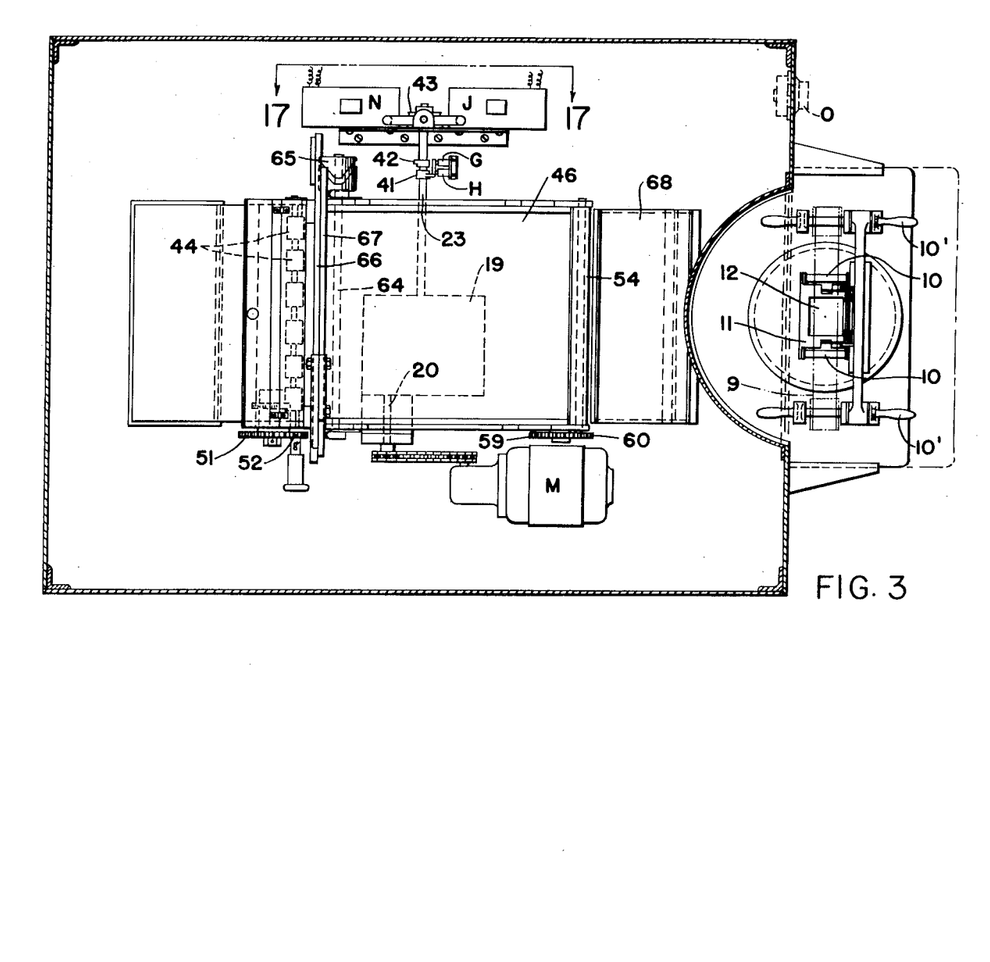
Figure 3 is a view in section taken along line 3—3 of Figure 2.
Figure 7:
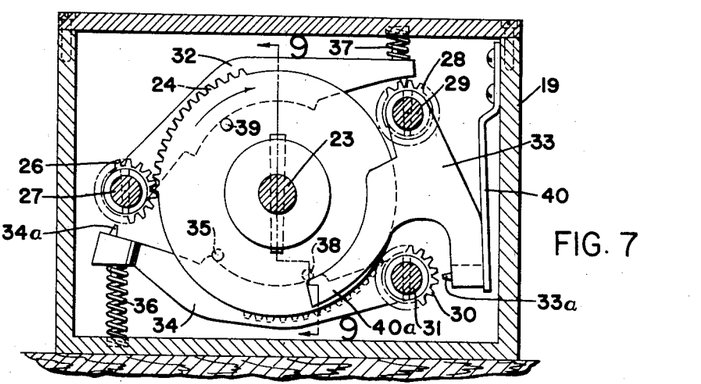
Figure 7 is a view in section taken along line 7—7 of Figure 4.
Figure 7A:
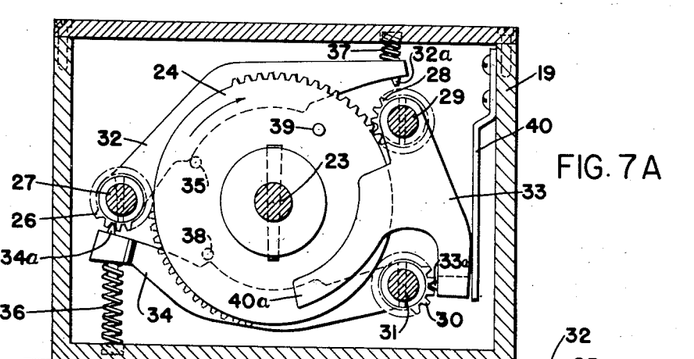
Figure 7a is a view in section similar to Figure 7, showing the mechanism in an alternate position.
Figure 8:
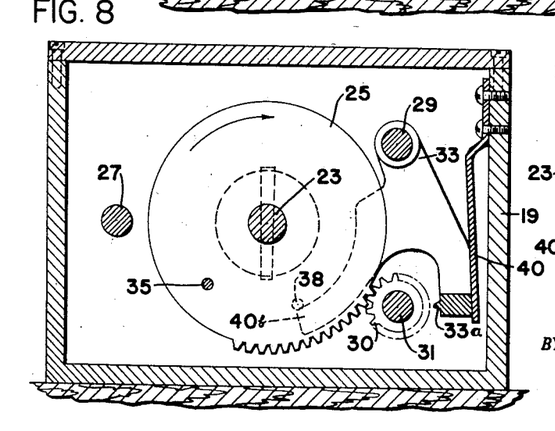
Figure 8 is a view in section taken along line 8—8 of Figure 4.
Figure 9:
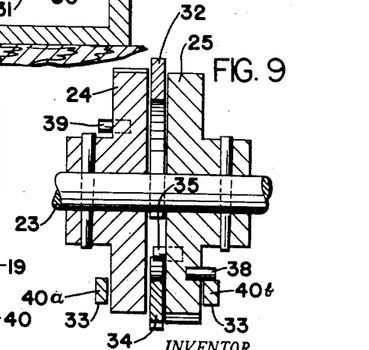
Figure 9 is a view in section taken along line 9—9 of Figure 7.

The feeding mechanism for feeding the sensitized paper P across the exposure table is provided with a motor M as a source of power. It includes a gear box 19 with a shaft 20, driven by a suitable gear reduction train from the electric motor M, as shown in Figure 3. Mounted on shaft 20 is a pinion 21 that meshes with a gear 22 on a shaft 23. Also on shaft 23 are gear segments 24 and 25. Gear segment 24 meshes intermittently with gear 26 on shaft 27, gear 28 on shaft 29 and gear 30 on shaft 31, as shown in Figures 7 and 7a. Gear 25 meshes intermittently with gear 30 on shaft 31, as shown in Figure 8. Shaft 23 is driven continuously from the motor reduction gear through shaft 20, pinion 21 and gear 22. Shafts 27, 29 and 31 are held in locked position, except when gear segments 24 and 25 are in position for meshing engagement. In order to lock the gears during each cycle, there are three spring loaded levers 32, 33 and 34, each having a point, or tooth, 32a, 33a, 34a, respectively, which presses between the teeth of a gear to hold it stationary. Lever 32 is pivoted on shaft 27 for engagement with gear 28. Lever 33 is pivoted on shaft 29 for engagement with gear 30. Lever 34 is pivoted on shaft 31 for engagement with gear 26, as shown in Figures 7, 7a, 8 and 9. In order to release gear 26 from its locked position, a pin 35 located in gear 25, depresses lever 34 against coil spring 36, permitting gear 26 to rotate. In order to release gear 28 from its locked position, the pin 35 depresses lever 32 against coil spring 37, permitting gear 28 to rotate. In order to release gear 30, two pins are used, pin 38 located in gear 25 depresses lever 33 against leaf spring 40 allowing gear 30 to rotate. Pin 39 located in gear 24 also depresses lever 33, and this also permits gear 30 to rotate the second time during each revolution of shaft 23. Lever 33 is formed with two cam surfaces, one cam 40a extends along the side of gear 24 on which pin 39 depresses, and a cam 40b which extends along the side of gear 25 which pin 39 depresses, as shown in Figure 9.

Figure 2:
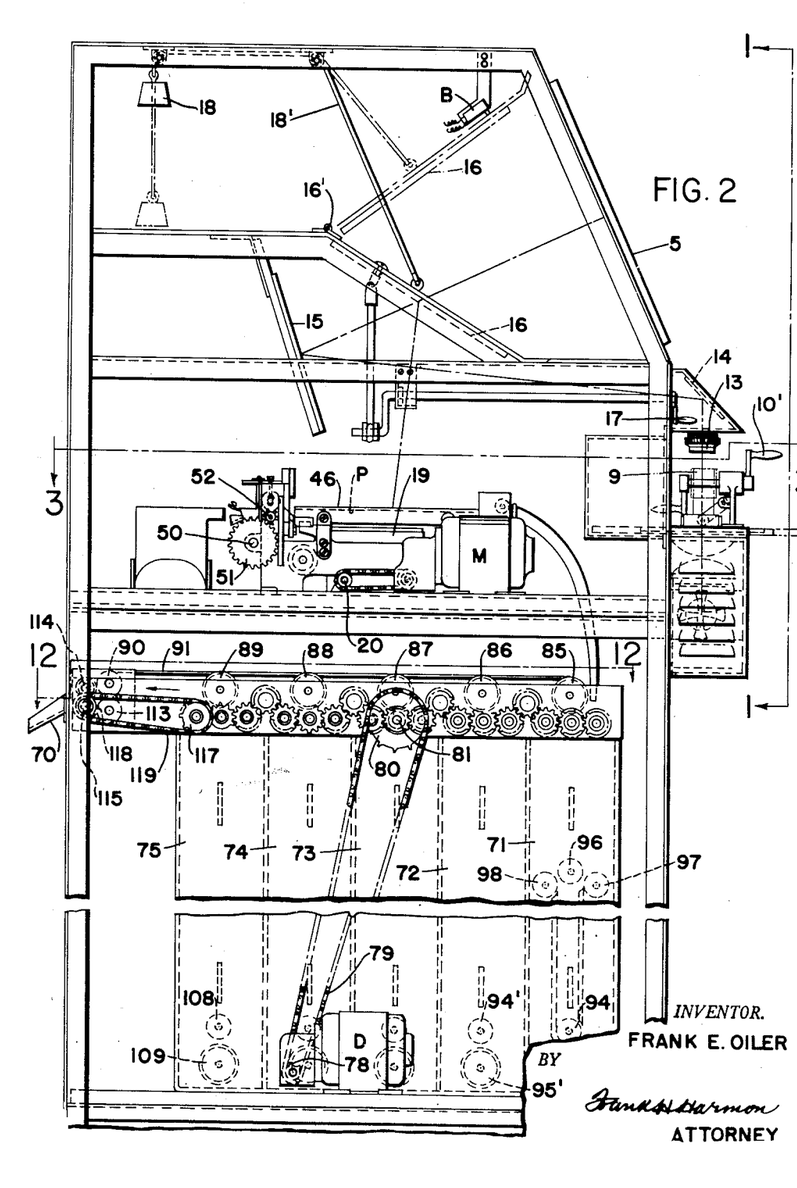
Figure 2 is a view in side elevation of machine, with the side panels removed and parts being broken away.
Figure 4:
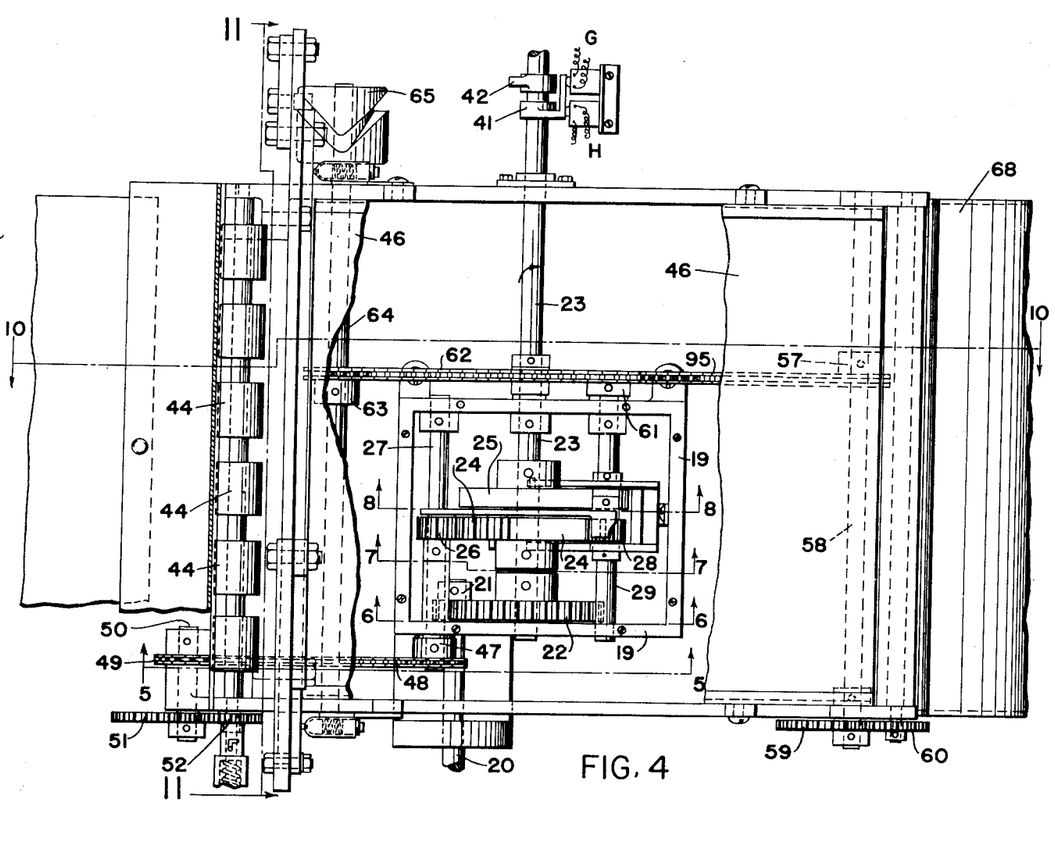
Figure 4 is an enlarged view showing part of the mechanism shown in Figure 3, with parts thereof being broken away and in section.
Figure 4A:
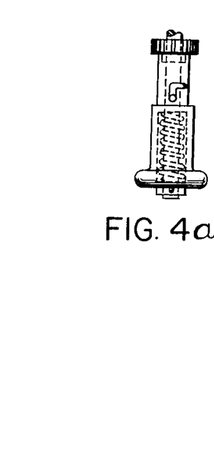
Figure 4a is an enlarged view of disengaging mechanism shown in Figure 4.
Figures 5, 6:
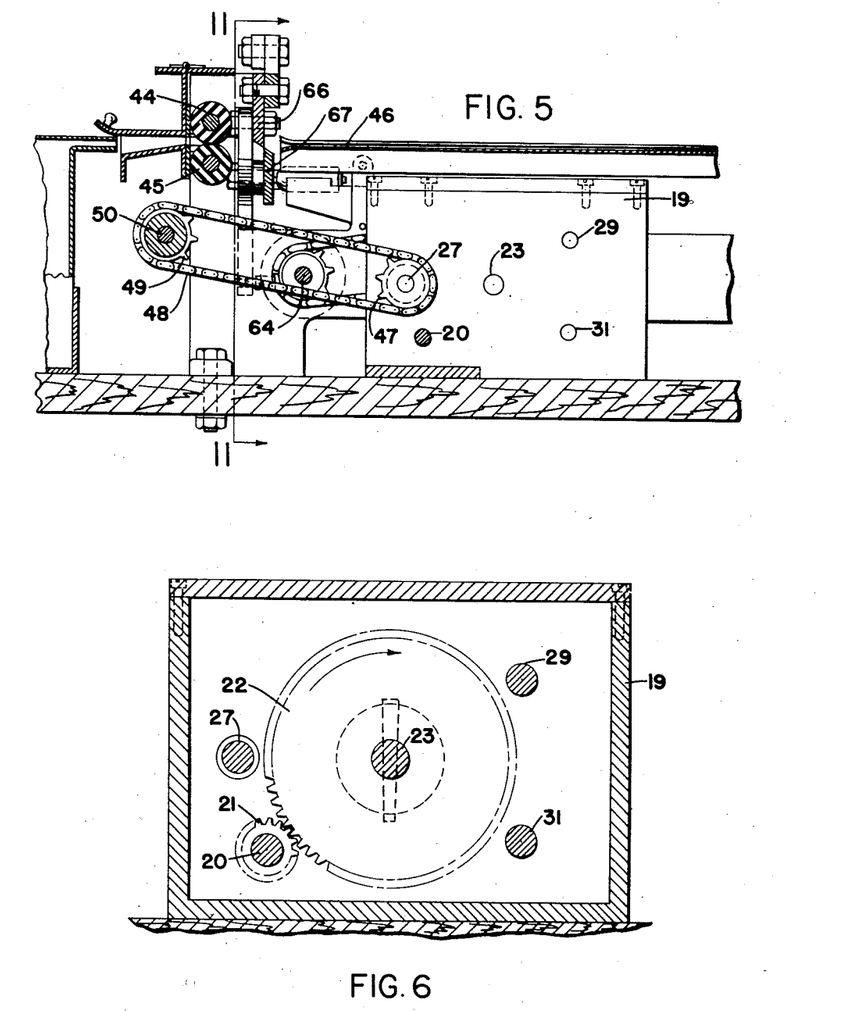
Figure 5 is a view in section taken along line 5—5 of Figure 4.
Figure 6 is a view in section taken along line 6—6 of Figure 4.
Figure 18:
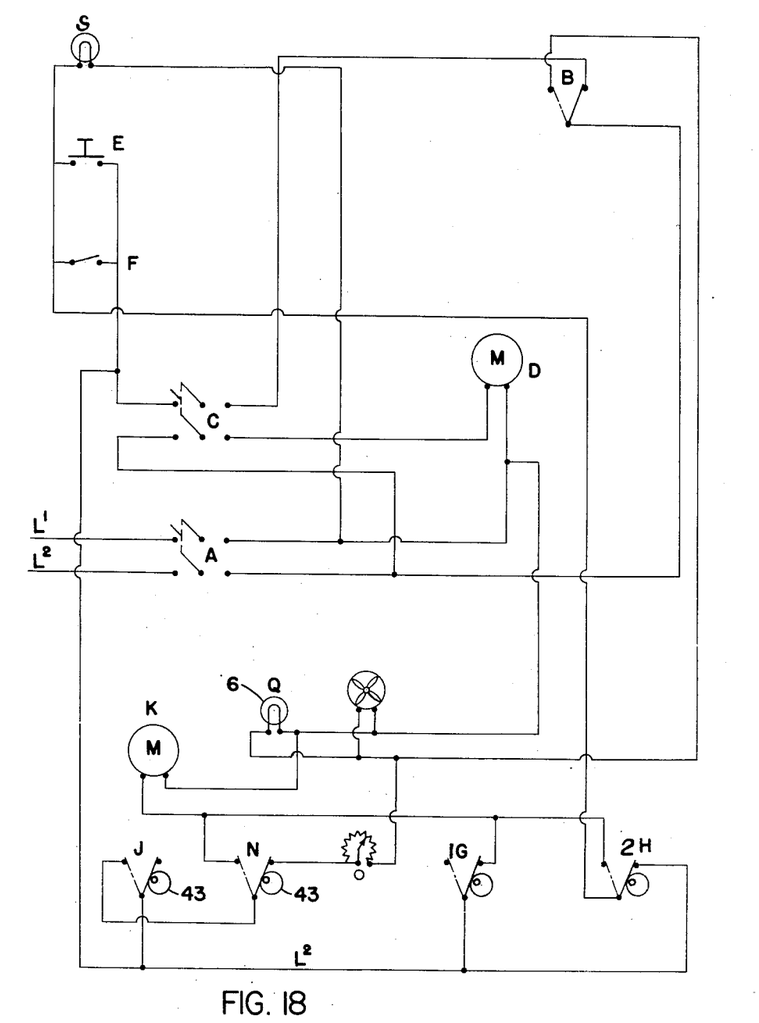
Figure 18 is a wiring diagram used in connection with the above mentioned mechanism.

Shaft 23 extends through gear box and has secured thereto three cams 41, 42 and 43, each of which operates a microswitch or time delay switch, as shown in Figures 3 and 18. Shaft 27 extends through gear box 19 and drives feed rollers 44 and 45 intermittently for feeding sensitized paper on to table 46 ready for exposure, as shown in Figures 4 and 5. To provide the exact length of paper, gear segment 24 drives feed rolls through gear 26, shaft 27, sprocket 47, chain 48, sprocket 49, countershaft 50, gear 51 and gear 52 secured to bottom feed roll shaft, as shown in Figures 2, 4 and 5.

Figure 10:
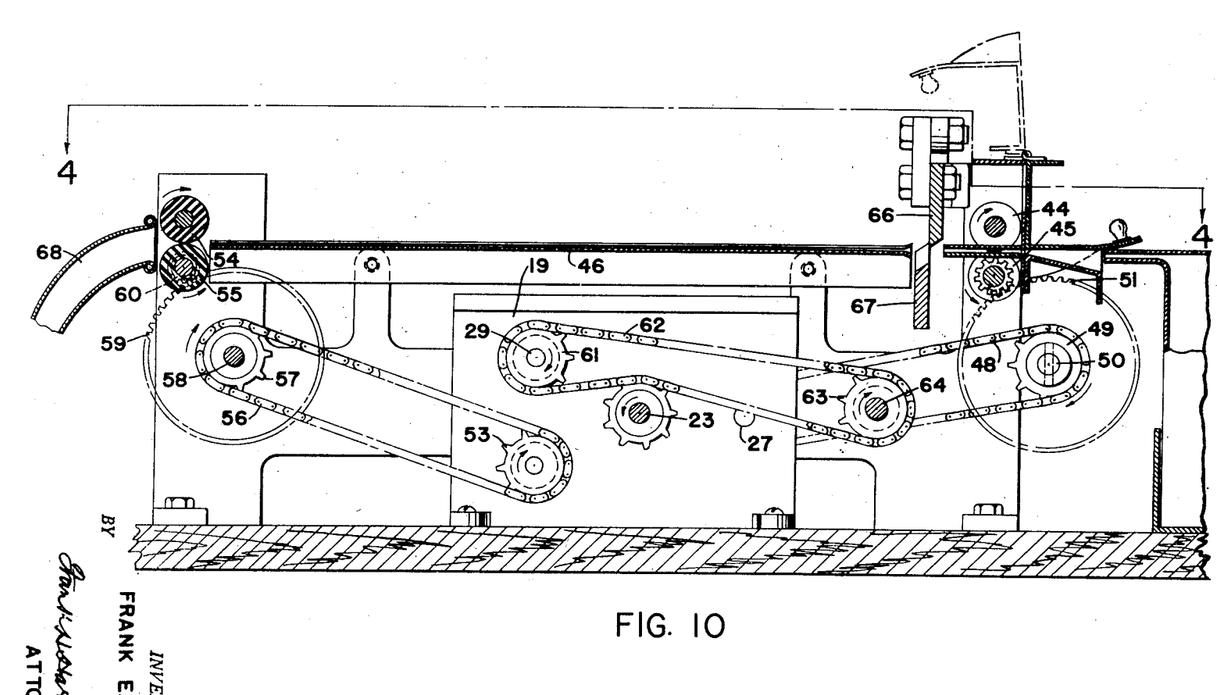
Figure 10 is a view in section taken along line 10—10 of Figure 4.
Figure 11:
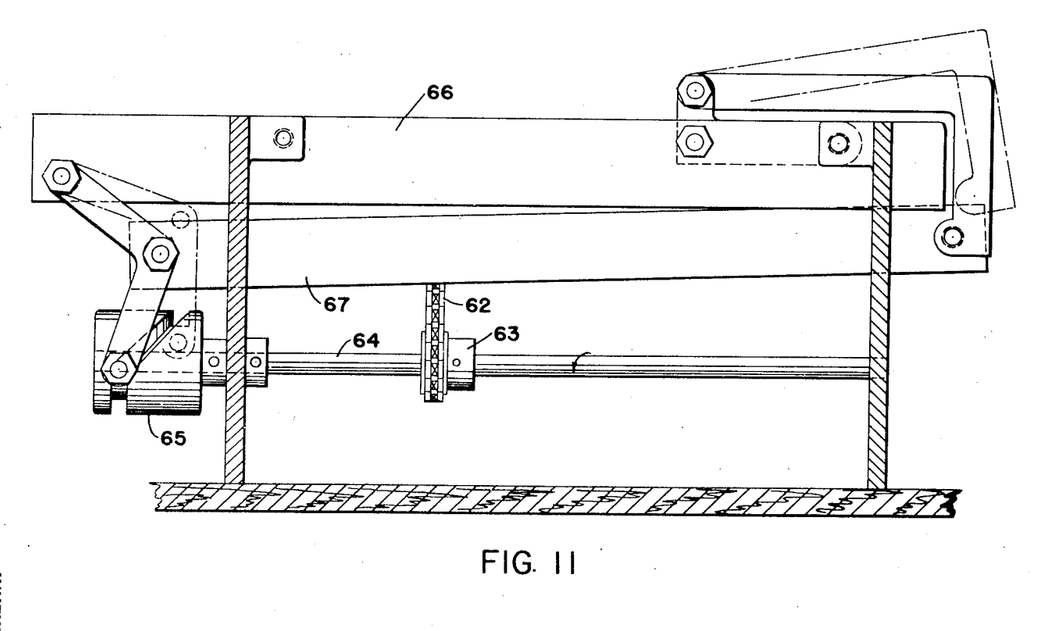
Figure 11 is a view in section taken along line 11—11 of Figure 4.

Shaft 31 extends through gear box 19 and has a sprocket 53 secured thereto for driving pinch rollers 54 and 55 through chain 56, sprocket 57, shaft 58 and gears 59 and 60. The arrangement is such that rolls 54 and 55 are driven a fraction of a turn after feed rolls 44 and 45 have stopped. This is done in order to put a slight tension in the paper on the table prior to exposure, as shown in Figure 10.

Shaft 29 extends through gear box 19 and drives knife cam through sprocket 61 on shaft 29, chain 62, sprocket 63 and cam shaft 64 on which cam 65 is secured. The arrangement is such that after exposure, gear segment 24 drives shaft 29 through sprocket 28 and operates the cutting knife through cam 65 to sever the paper.

The cutting knife comprises an upper stationary blade 66 and lower movable blade 67. During the cutting operation, the cam 65 mounted on shaft 64 not only moves the blade 67 upwardly, bodily slightly to the right, as viewed in Figure 10, into abutment with the forward surface of blade 66 to insure a sharp cut of the paper.

The sequence of the exposure and cutting cycle thus far described includes first the optical system having been positively shifted from the film viewing position to the paper exposing position, the positive feeding of the sensitized paper onto the exposure table, the placing of the same under longitudinal tension, the timed exposure of the image of the film onto the same, and the cutting of the same at the rear edge of the exposed predetermined length of the paper. This cycle of operation continues to the extent of the rollers 54 and 55 engaging the front end of the exposed length of paper to draw it forward off the exposure table through a chute 68 into the development compartment 3 where it is engaged by conveying belts driven by motor driven pulleys through the various stages of developing and finishing the print. This leaves the exposure table bare, in the event that the electrical control for the device has been actuated to make a single or multiple exposure and, in any event, the exposure table has been cleared in readiness for the next paper feeding, exposing, cutting and removal cycle of operation.

The sequence of operation of the electrical control system, shown schematically in Figure 18, is as follows. The main switch A is a double pole double throw switch. It breaks both sides of the 110 volt in-put line. One pole breaks line L1, which is common to all units actuated by current. All controls operate only by making or breaking line L2. Line L2 leads from the main switch to a microswitch B mounted in such position that the movable mirror shelf actuates said switch when in the raised position. In this raised position, and with the micro-switch B actuated, current flows through the normally open side of the micro-switch which is now closed to the light source S, and the light remains on constantly until this switch is released or main switch is shut off. With this switch released, current flows through the normally closed side of the switch to one side of the double pole double throw developing tank switch C. Current is also supplied directly from the main switch to the other pole of the developing tank switch C. With the developing tank switch in off position, no current flows to any point except the light. With the developing tank switch in the on position, current flows directly to the developing motor D through the one side of the switch, flows to the rest of the units through the other side providing reading machine microswitch B is not actuated. Current is supplied from the developing motor D to the momentary contact switch E the continuous operation single pole single throw switch F and also to the common of microswitch No. 1G, to the normally closed position on microswitch 2H and to the common of the first time delay relay J. At the end of the cycle micro-switch 1G and 2H are actuated breaking current through No. 1G normally closed position to the motor K. Upon pushing the momentary contact switch E or throwing the continuous operation switch F on, current flows through micro-switch 2H in the normally open position which is closed and starts the motor K, which turns the actuating cam so that micro-switch 1G is not actuated and current flows to the motor K then through the normally closed side of micro switch 1G. The motor continues running until such time as a second cam which actuates only micro-switch 1G turns to its actuating position. This stops the motor K but does not actuate micro switch 2H. Therefore, the momentary contact E and/or the continuous operation switch F will not override micro-switch 1G through micro-switch 2H. This is so that the motor K cannot be accidentally started during the shut down time for exposure. However, since current is being supplied to the normally closed side of micro-switch 2H directly from the developing tank switch C and since it is not actuated, current flows through the common pole on micro switch 2H back to the pilot light S keeping said pilot light on even though motor is shut down.

At the same time micro-switch 1G is actuated both the first J and second N time delay relays are also actuated by a third cam. After approximately five seconds, the first time delay relay J actuates closing the normally open side and supplying current to the common of the second time delay relay N. Current is then supplied through the normally closed side of time delay relay N to the light Q which makes the exposure. A rheostat O located in this circuit controls manually the density of the light. During this exposure the second time delay relay micro-switch N has as yet not been actuated. When it is actuated the normally closed side is open, shutting off the light Q and the normally open side is closed which again supplies current to the motor K overriding micro-switch 1G. The unit then continues running until the double cam actuates micro-switch 1G and micro-switch 2H and again shuts down the motor K at the end of the cycle. It may be noted that if the reading machine micro-switch B is actuated, the developing tank will run providing that switch is on but no copies can be run. It will also be noted that should the reading machine switch B not be on and if the developing tank switch C is not on, a cycle cannot be started. If the continuous operation switch is on it will be noted it merely provides a continuous overriding of micro-switch 1G when micro-switch 2H is actuated, that is at the end of a normal cycle.

The mechanism for carrying the exposed sensitized paper, after it has been positively drawn from the exposure table by rollers 54 and 55, through the developing, stopping, fixing and washing baths, includes a series of carrying belts and pulleys, gear operated by a motor D that is separate and distinct from the main motor M. The developer compartment 3 provides a housing for the developer assembly, which, in the order of travel of the exposed paper from the intake chute 68 to the discharge chute 70, is shown to include fine successively arranged individual open top transparent tanks 71, 72, 73, 74 and 75, each partially filled with liquid. Tank 71 contains developer liquid, tank 72 a liquid for stopping the developing action and for fixing, tank 73 an acid fixing bath liquid, and tanks 74 and 75 successive water for washing. Each of these separate tanks is provided near its top with an individual liquid filler spout 76 and near its bottom with a drain hole and discharge hose 77.

Figure 12:
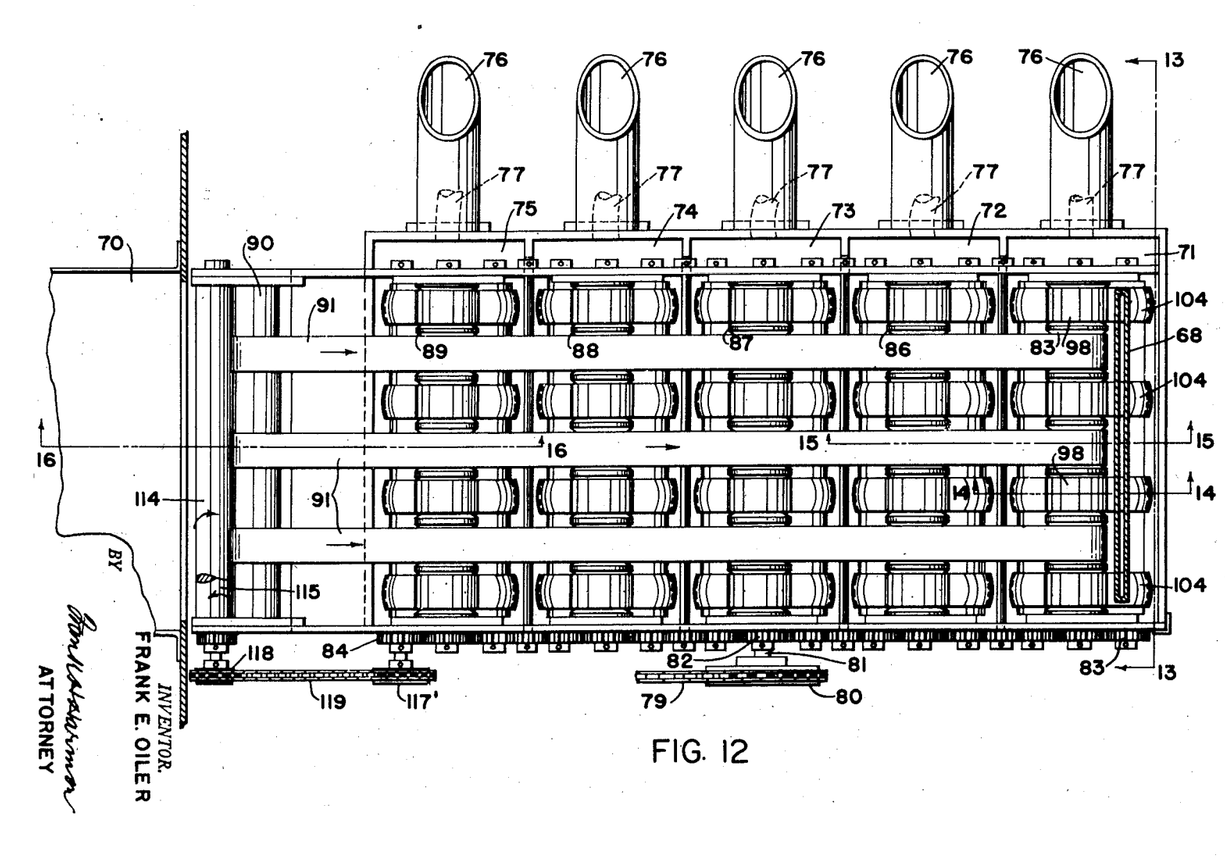
Figure 12 is a view in section taken along line 12—12 of Figure 2.

The motor D drives a sprocket wheel 78 which carries a chain 79 to drive a relatively larger sprocket wheel 80 mounted on a shaft 81 that also carries the main operating gear 82 of a chain of meshing and alternately oppositely rotating gears as shown from right to left in Figure 12 as including from gear 83 to gear 84, inclusive. This train of gears rotates upper main pulleys 85 to 89, inclusive, arranged respectively above the open top tanks 71 to 75, inclusive, and an additional roller 90, all rotating in the same direction, and about which are stretched endless conveyor belts 91. Also arranged above the upper ends of each of the tanks are a pair of relatively smaller pulleys, one on each side of and below the larger upper pulleys. Such a pair of smaller pulleys are shown at 92 and 93 above tank 71. Near the bottom of the tank 71 is a relatively small idler pulley 94. Below idler pulley 94 is a larger idler pulley 95, disposed also below a small pulley 96. Below pulleys 92 and 93 and on each side of pulley 96 are pulleys 97 and 98. About pulleys 85 and 96 is an endless belt 98' and about pulleys 96 and 94 is an endless belt 99. About pulleys 95, 97 and 98 is an endless belt 100. Above tank 72 is a different system of pulleys and belts, namely upper and lower pulleys 86 and 94', about which extends an endless belt 101 and pulleys 92', 93' and 95', about which an endless belt 102 extends. Extending about pulley 93, above tank 71, and pulley 92', above tank 72, is an endless belt 103.

Figure 13:
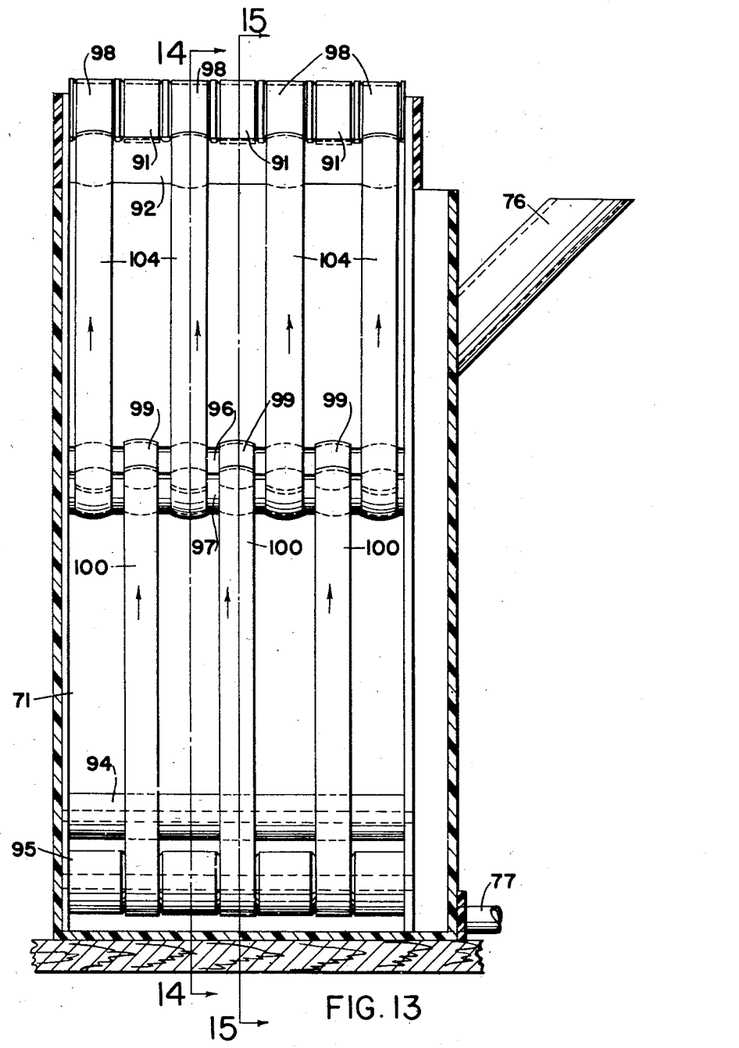
Figure 13 is a view in section taken along line 13—13 of Figure 12.
Figures 14, 15:
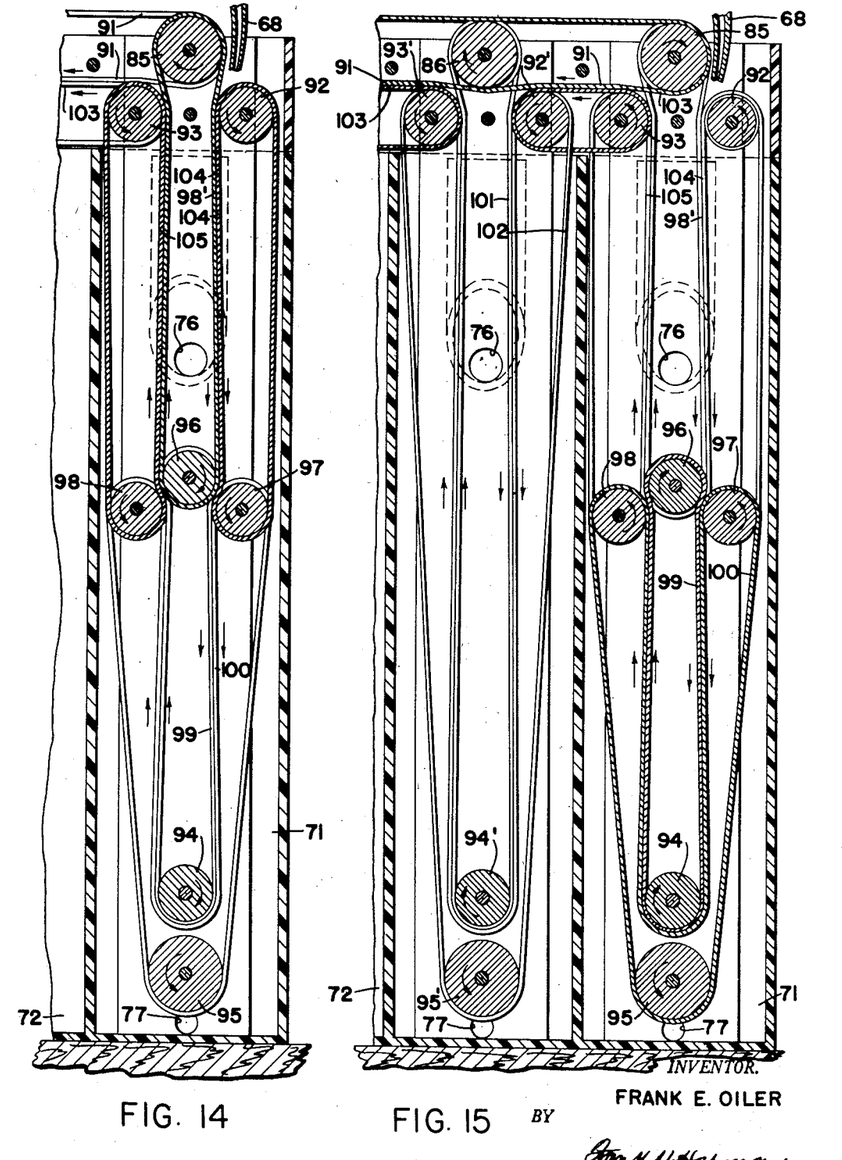
Figure 14 is a view in section taken along line 14—14 of Figure 12.
Figure 15 is a view in section taken along line 15—15 of Figure 12.

Thus, with the upper pulleys 85 to 90, inclusive, being driven in the direction of the arrows, the belt system will cause the other pulleys to be driven in the directions also shown by the arrows. As the exposed sheet of sensitized paper enters the developer tank 71, through chute 68, it will initially enter between belt 98, which extends about pulleys 85 and 96, and belt 104, which extends about pulleys 92 and 97, as shown in Figures 14 and 15, and be positively fed downwardly into the developer liquid in the tank. As the paper is being fed past pulley 96, it is engaged between belts 99 and 100, which are laterally staggered with relation to belts 98 and 104, as shown in Figure 13, to insure proper immersion of the paper to the entire surface of the paper. As the paper has passed downwardly past pulley 94 and upwardly past pulley 98, it is then engaged between belt 98, which is about pulleys 85 and 96, and belt 105 which is about pulleys 93 and 98. This feeds the paper upwardly out of the tank 71 to a point where it is then engaged between the main belt 91 and belt 103 that is about pulleys 93 and 92'. This belt arrangement carries the paper over into the next tank 72, where it is fed between belts 101 and 102 downwardly past pulley 94', and then upwardly and out of the tank 72 and into tank 73 in a manner similar to that described in connection with the paper being fed from tank 71 to tank 72.

Figures 16, 17:
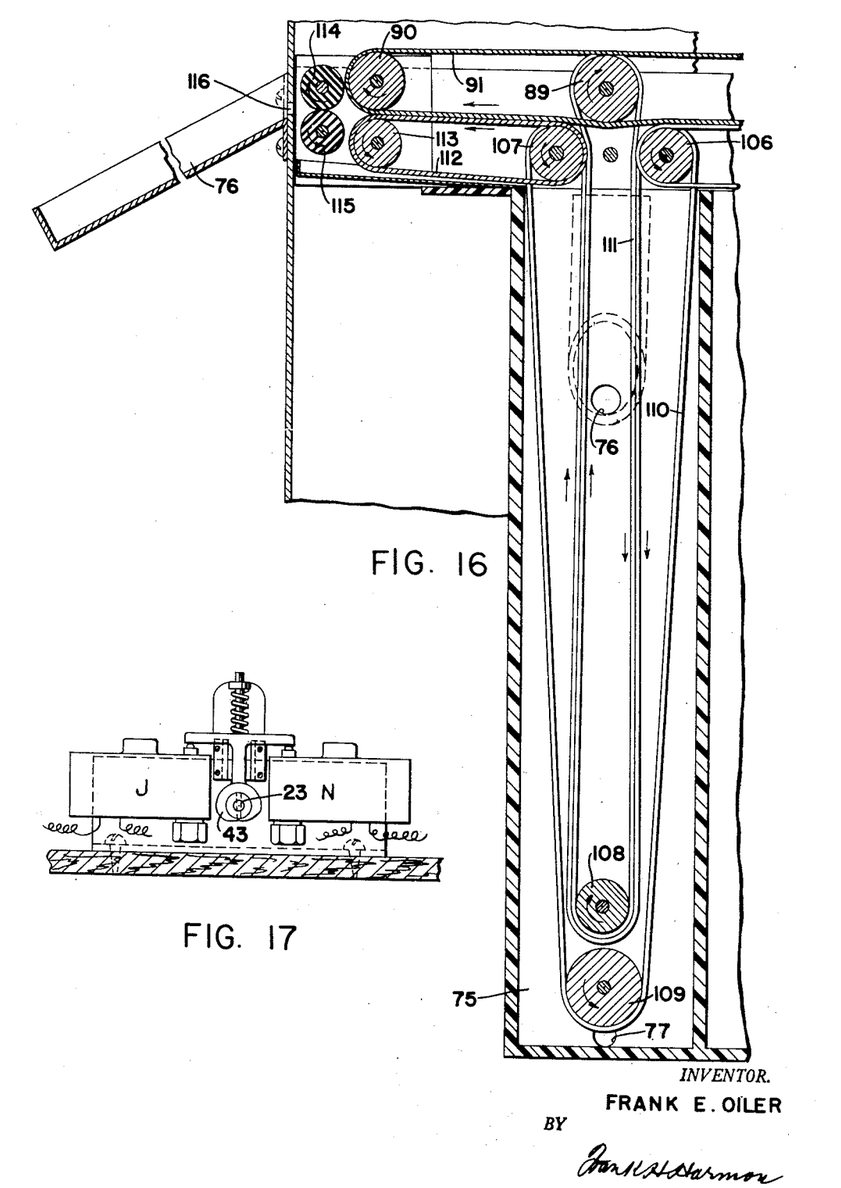
Figure 16 is a view in section taken along line 16—16 of Figure 12.
Figure 17 is a view in section taken along line 17—17 of Figure 3.

Figure 16 shows the final water wash tank 75. Here, are provided pulleys 106, 107 and 109 about which is an endless belt 110, and pulleys 89 and 108 about which is an endless belt 111. Also about pulleys 107 and 113 is an endless belt 112. Thus, after the paper has, by being engaged between belts 110 and 111, been drawn down past pulley 108 and up past pulley 107, it is engaged between main belt 91 and belt 112 so as to be fed past pulleys 90 and 113. The paper is then engaged between rollers 114 and 115 which are driven in opposite directions, as indicated, to feed the paper out through housing slot 116 and down the chute 70 to the exterior, as a complete final print. In order to provide for the rotation of feed rollers 114 and 115, I may provide a sprocket wheel 117, driven by the gear train that is driven by the main sprocket 80 that is driven by the motor D. Mounted on the same shaft that carries roller 115 is a sprocket wheel 118. An endless chain 119 extends about sprockets 117 and 118. This makes roller 115 the driving roller and roller 114 the idler.

Figure 1:
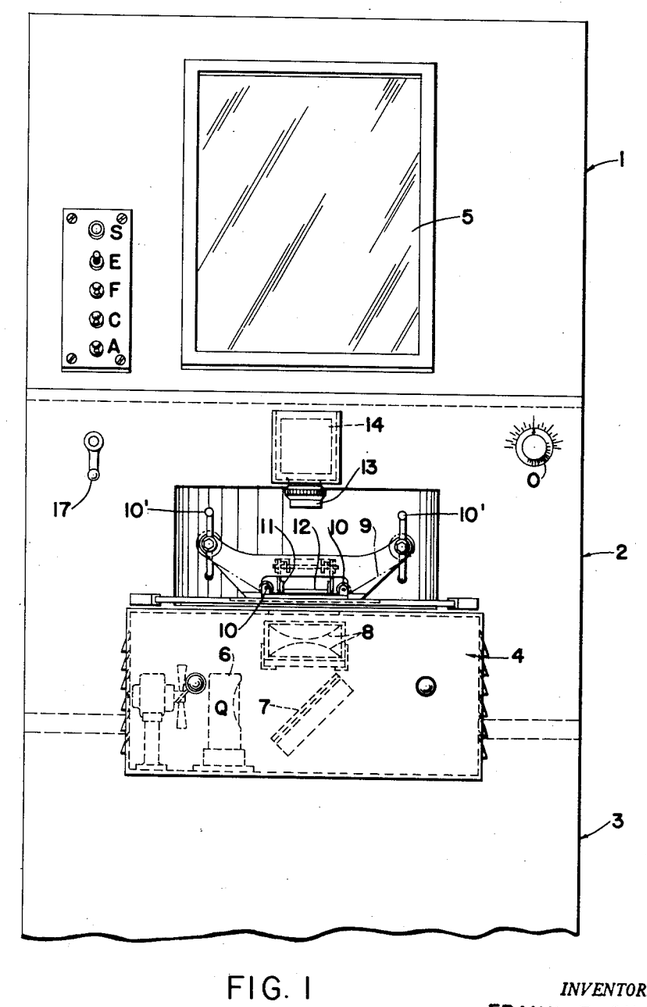
Figure 1 is a view in front elevation of one form of machine, which my invention may take, viewing from the right side of Figure 2, parts thereof being broken away.
Figure 19:
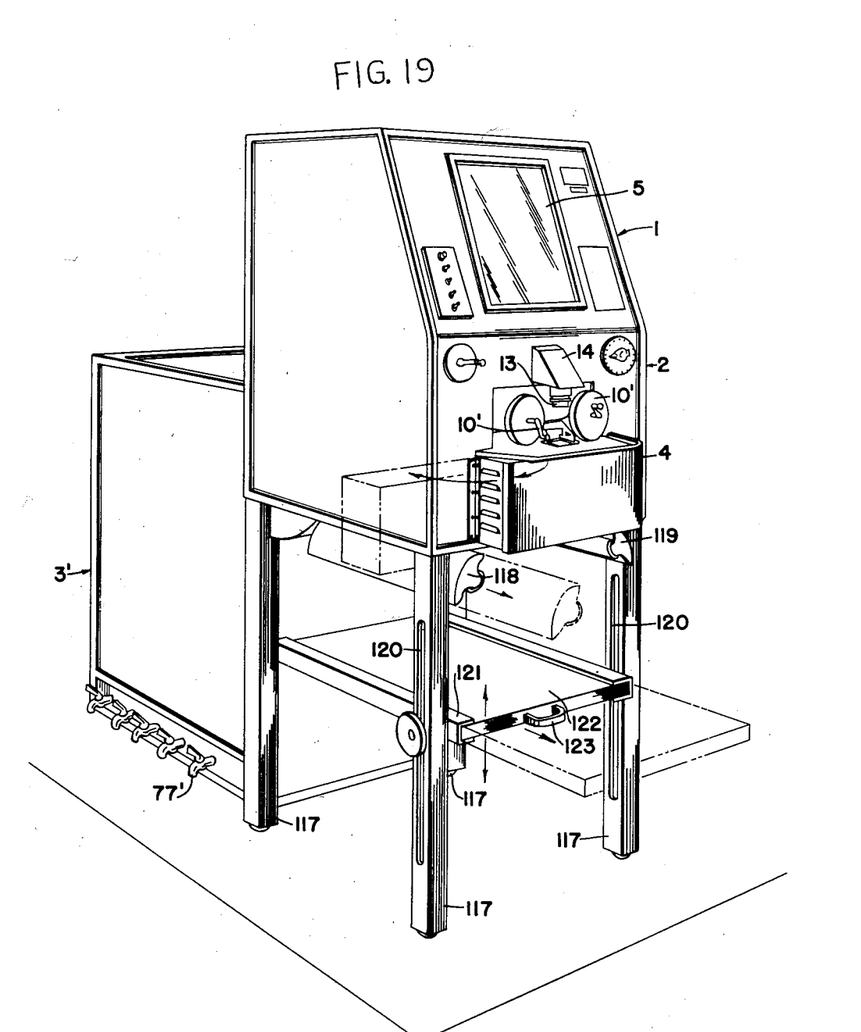
Figure 19 is a view in three-quarter elevation of a modified form of cabinet arrangement.

In order to demonstrate the versatility of my inventive principle, I have shown in Figure 19 how quickly and readily my machine may be converted into a photostat machine. By reference comparison to Figure 1, it will be seen that this entails the combining of compartments 1 and 2 and the supporting of the same by four legs 117. It further entails the removal of the developer compartment to the rear, as shown at 3' with drain faucets 77'. As shown in Figure 19, the machine is complete as an apparatus for performing the same function as that described in connection with Figures 1 to 18, inclusive. Should it be desired to operate the same as a photostat machine, no use is made of the viewing screen 5. Moreover, the film carrier and compartment 4 are pivotally mounted to be swung from the full line position in the direction of the arrows to that shown in phantom lines. Lights 118 and 119 are mounted on overhead tracks to be pulled out, as indicated. Guide tracks 120 are provided for vertical adjustment of holder 121 for a slidable tray 122 provided with a handle 123. A hand knob 124 is for the purpose of locking the tray holder in vertical adjusted position.

I claim:

1. A combined photographic film projector and printer of sensitized paper exposed to the projected image of the film comprising a housing, a light source, an optical system including lenses and mirrors, a film carrier having means for feeding film through the optical system to intercept light beams from the light source, a translucent screen constituting a part of one wall of the housing, the mirrors of the optical system including a pair of angularly disposed stationary mirrors for projecting an enlarged image of said film on the screen to be viewed from the exterior of the housing, the film carrier being mounted on the housing so as to be adjustable in three planes of movement for adjusting and positioning the image on the screen, a stationary table for receiving sensitized paper, a manually movable mirror adjustable into and out of, a position to intercept the light beam from one of the stationary mirrors to the screen so as to project the image of the film toward the exposure table, a dark box and a reel therein for supporting a roll of sensitized paper, a main motor and gear operated feed roll means driven thereby for positively drawing the paper from the roll across the exposure table in predetermined lengths per cycle of operation of the main motor under switch control, automatic time delay switch means in circuit with the main motor for interrupting the operation of the paper feeding means for a predetermined time interval for exposure to the film image, the paper feed roll means including rolls at the forward and rear ends of the exposure table in the path of travel of the paper, paper severing knife arranged at the rear end of the exposure table adjacent the paper reel in the dark box and driven by the gear train for feeding the paper and so correlated with the operation thereof as to cut the paper at the rear edge after exposure, the paper feed rolls at the front end of the exposure table, after the paper severing operation, being adapted in sequence to positively draw the exposed length of paper off of the exposure table to complete a single cycle of operation initiated by the energization of the main motor without the further advance of paper from the reel onto the exposure table.

2. A combined photographic film projector and printer of sensitized paper exposed to the projected image of the film comprising a housing, a light source, an optical system including lenses and mirrors, a film carrier having means for feeding film through the optical system to intercept light beams from the light source, a translucent screen constituting a part of one wall of the housing, the mirrors of the optical system including a pair of angularly disposed stationary mirrors for projecting an enlarged image of said film on the screen to be viewed from the exterior of the housing, the film carrier being mounted on the housing so as to be adjustable in three planes of movement for adjusting and positioning the image on the screen, a stationary table for receiving sensitized paper, a manually movable mirror adjustable into and out of, a position to intercept the light beam from one of the stationary mirrors to the screen so as to project the image of the film toward the exposure table, a dark box and a reel therein for supporting a roll of sensitized paper, a main motor and gear operated feed roll means driven thereby for positively drawing the paper from the roll across the exposure table in predetermined lengths per cycle of operation of the main motor under switch control, automatic time delay switch means in circuit with the main motor for interrupting the operation of the paper feeding means for a predetermined time interval for exposure to the film image, the paper feed roll means including rolls at the forward and rear ends of the exposure table in the path of travel of the paper to tighten the paper during the exposure interval, a cam actuated paper severing knife arranged at the rear end of the exposure table adjacent the paper reel in the dark box and driven by the gear train for feeding the paper and so correlated with the operation thereof as to cut the paper at the rear edge after exposure, the paper feed rolls at the front end of the exposure table, after the paper severing operation, being adapted in sequence to positively draw the exposed length of paper off of the exposure table to complete a single cycle of operation initiated by the energization of the main motor without the further advance of paper from the reel onto the exposure table, and a micro switch in circuit with the main motor and automatically operated by engagement thereof by the movable mirror when the latter is adjusted so as to not intercept the light beam between the screen and one of the stationary mirrors for preventing energization of the main motor for operating the paper feeding mechanism while the image of the film is being projected onto the screen.

3. A combined photographic film projector and printer of sensitized paper exposed to the projected image of the film comprising a housing, a light source, an optical system including lenses and mirrors, a film carrier having means for feeding film through the optical system to intercept light beams from the light source, a stationary table for receiving sensitized paper, a mirror disposed in a position to intercept the light beam from one of the stationary mirrors to the screen so as to have the image of the film projected toward the exposure table, a dark box and means therein for supporting a roll of sensitized paper, a main motor and gear operated feed roll means driven thereby for positively drawing the paper from the dark box across the exposure table in predetermined lengths per cycle of operation of the main motor under switch control, automatic time delay switch means in circuit with the main motor for interrupting the operation of the paper feeding means for a predetermined time interval for exposure to the film image, the paper feed roll means including rolls at the forward and rear ends of the exposure table in the path of travel of the paper, a paper severing knife arranged at the rear end of the exposure table adjacent the dark box and driven by the gear train for feeding the paper and so correlated with the operation thereof as to cut the paper at the rear edge after exposure, the paper feed rolls at the front end of the exposure table, after the paper severing operation, being adapted in sequency to positively draw the exposed length of paper off of the exposure table to complete a single cycle of operation initiated by the energization of the main motor without the further advance of paper from the reel onto the exposure table.

4. A combined photographic film projector and printer of sensitized paper exposed to the projected image of the film comprising a housing, a light source, an optical system including lenses and mirrors, a film carrier having means for feeding film through the optical system to intercept light beams from the light source, the film carrier being mounted on the housing so as to be adjustable in three planes of movement for adjusting and positioning the image, a stationary table for receiving sensitized paper, a mirror disposed in a position to intercept the light beam from one of the stationary mirrors to the screen so as to have the image of the film projected toward the exposure table, a dark box and a reel therein for supporting a roll of sensitized paper, a main motor and gear operated feed roll means driven thereby for positively drawing the paper from the roll across the exposure table in predetermined lengths per cycle of operation of the main motor under switch control, automatic time delay switch means in circuit with the main motor for interrupting the operation of the paper feeding means for a predetermined time interval for exposure to the film image, the paper feed roll means including rolls at the forward and rear ends of the exposure table in the path of travel of the paper, during the exposure interval, a cam actuated paper severing knife arranged at the rear end of the exposure table adjacent the paper reel in the dark box and driven by the gear train for feeding the paper and so correlated with the operation thereof as to cut the paper at the rear edge after exposure, the paper feed rolls at the front end of the exposure table, after the paper severing operation, being adapted in sequency to positively draw the exposed length of paper off of the exposure table to complete a single cycle of operation initiated by the energization of the main motor without the further advance of paper from the reel onto the exposure table.

5. A combined photographic film projector and printer of sensitized paper exposed to the projected image of the film comprising a housing, a light source, an optical system including lenses and mirrors, a film carrier having means for feeding film through the optical system to intercept light beams from the light source, a translucent screen constituting a part of one wall of the housing, the mirrors of the optical system including a pair of angularly disposed stationary mirrors for projecting an enlarged image of said film on the screen to be viewed from the exterior of the housing, the film carrier being mounted on the housing so as to be adjustable in three planes of movement for adjusting and positioning the image on the screen, a stationary table for receiving sensitized paper, a manually movable mirror adjustable into and out of, a position to intercept the light beam from one of the stationary mirrors to the screen so as to project the image of the film toward the exposure table, a dark box and a reel therein for supporting a roll of sensitized paper, a main motor and feed roll means driven thereby for positively drawing the paper from the roll across the exposure table in predetermined lengths per cycle of operation of the main motor under switch control, automatic time delay switch means in circuit with the main motor for interrupting the operation of the paper feeding means for a predetermined time interval for exposure to the film image, the paper feed roll means including rolls at the forward and rear ends of the exposure table in the path of travel of the paper to tighten the paper during the exposure interval, a cam actuated paper severing knife arranged at the rear end of the exposure table adjacent the paper reel in the dark box and driven by the gear train for feeding the paper and so correlated with the operation thereof as to cut the paper at the rear edge after exposure, the paper feed rolls at the front end of the exposure table, after the paper severing operation, being adapted in sequence to positively draw the exposed length of paper off of the exposure to complete a single cycle of operation initiated by the energization of the main motor without the further advance of paper from the reel onto the exposure table.

References Cited in the file of this patent

UNITED STATES PATENTS

| Number | Name | Date |
|---|---|---|
| 1,019,297 | Bresee | Mar. 5, 1912 |
| 1,040,976 | Coqueugniet | Oct. 8, 1912 |
| 1,882,111 | Beidler | Oct. 11, 1932 |
| 2,473,174 | Pifer | June 14, 1949 |
| 2,474,159 | Pejois | June 21, 1949 |
| 2,517,414 | Pratt | Aug. 1, 1950 |
| 2,592,735 | Pirmov | Apr. 15, 1952 |
| 2,607,264 | Gazza | Aug. 19, 1952 |

FOREIGN PATENTS

| | | |
|---|---|---|
| 337,442 | Great Britain | Oct. 22, 1930 |